United States Patent [19]

Shaw

[11] Patent Number: 4,613,933

[45] Date of Patent: Sep. 23, 1986

[54] DIGITAL DRIVE SYSTEM FOR PULSE WIDTH MODULATED POWER CONTROL

[75] Inventor: Benjamin C. Shaw, Granada Hills, Calif.

[73] Assignee: Allied Corporation, Morristown, N.J.

[21] Appl. No.: 689,135

[22] Filed: Jan. 7, 1985

[51] Int. Cl.$^4$ ............................................. H02H 7/22
[52] U.S. Cl. ....................................... 363/55; 363/41
[58] Field of Search ....................... 363/41, 55, 56, 123

[56] References Cited

U.S. PATENT DOCUMENTS

4,466,052 8/1984 Tharp ...................................... 363/41

Primary Examiner—Patrick R. Salce
Assistant Examiner—Anita M. Ault
Attorney, Agent, or Firm—Robert C. Smith; Vett Parsigian

[57] ABSTRACT

A digital drive system for a pulse width modulated power control utilizes an output transformer driving a load device with the transformer primary winding being connected to a pair of power output devices such as field effect transistors. Each of the output devices is switched on and off from a flip-flop whose "on" and "off" time is controlled by means of digital counters and gate devices, the times of "off" and "on" cycles being controlled by a digital counter connected to a clock and receiving amplitude information from a digital register which is programmable to vary the count of the amplitude counter with a desired variation in amplitude. By programming the gate devices to switch from one flip-flop to the other with an identical clock count, the two half cycles of the output signal supplied to the transformer are maintained identical and ensure that the transformer core is not saturated. Where desired, a digital phase counter may be used to modify the counter output relative to the clock to shift the phase output relative to the clock without danger of unbalancing the output waveform.

13 Claims, 4 Drawing Figures

DIGITAL DRIVE SYSTEM FOR PULSE WIDTH MODULATED POWER CONTROL

This invention relates to a digital drive system for pulse width modulated power control.

Power amplifier designs using pulse width modulation as the controlling means to control output effective voltage are well known in the art. In such designs, an output transformer is almost invariably utilized to provide for isolation, impedance matching, to provide multiple voltage outputs, and the like. Transformers using ferromagnetic cores (in metallic or non-metallic forms as ferrite) are subject to saturation of the core material if the volt-second product of the two halves of the applied waveform are unequal. To ensure that the two halves are equal generally requires that the switch "on" times of the two half-periods of the waveform be identical.

A common means to implement pulse width modulation of such a system utilizes an analog control system using an oscillator providing a sawtooth waveform at a frequency twice that of the desired output. The output of the controlling oscillator is compared in a comparator with a reference voltage, varied as necessary to produce the desired modulating control function, and the output of the comparator used to control the output amplifier "on" time. Successive oscillations are steered by flip-flop and gating techniques to provide the two halves of the complete output waveform (plus and minus).

In many cases, and particularly in applications for sonar transmitters, it is required that the instantaneous phase of the output signal remain constant despite variations in the programmed amplitude. It is also frequently desirable to establish specific phases of a multitude of transmitters with respect to a reference time or reference phase.

The analog technique described suffers from a number of difficulties. One of the more serious problems is that the respective half cycles are made unequal should noise enter the system which results in a different effective reference level for the comparator between the two half-periods of a complete output cycle. This commonly occurs in actual equipment because of ground currents induced into the oscillator circuitry from high power output circuitry. Additionally, any inequality in the rising and falling slopes of the oscillator sawtooth wave will result in phase shift of the output as the amplitude is varied. It is also difficult to implement a remote control facility, as by telemetry, to reliably control a multitude of such pulse width modulated output amplifying devices when the analog system is used. The saturation of the transformer cores resulting from the unequal half cycles referred to above can result in excessive power dissipation and destruction of output transistors. Further, the phase shifts resulting from variations in the rising and falling slopes of the oscillator sawtooth wave introduce errors when a system is designed to use phase relationships as a control parameter, as in phased array beam steering.

Figure 1:
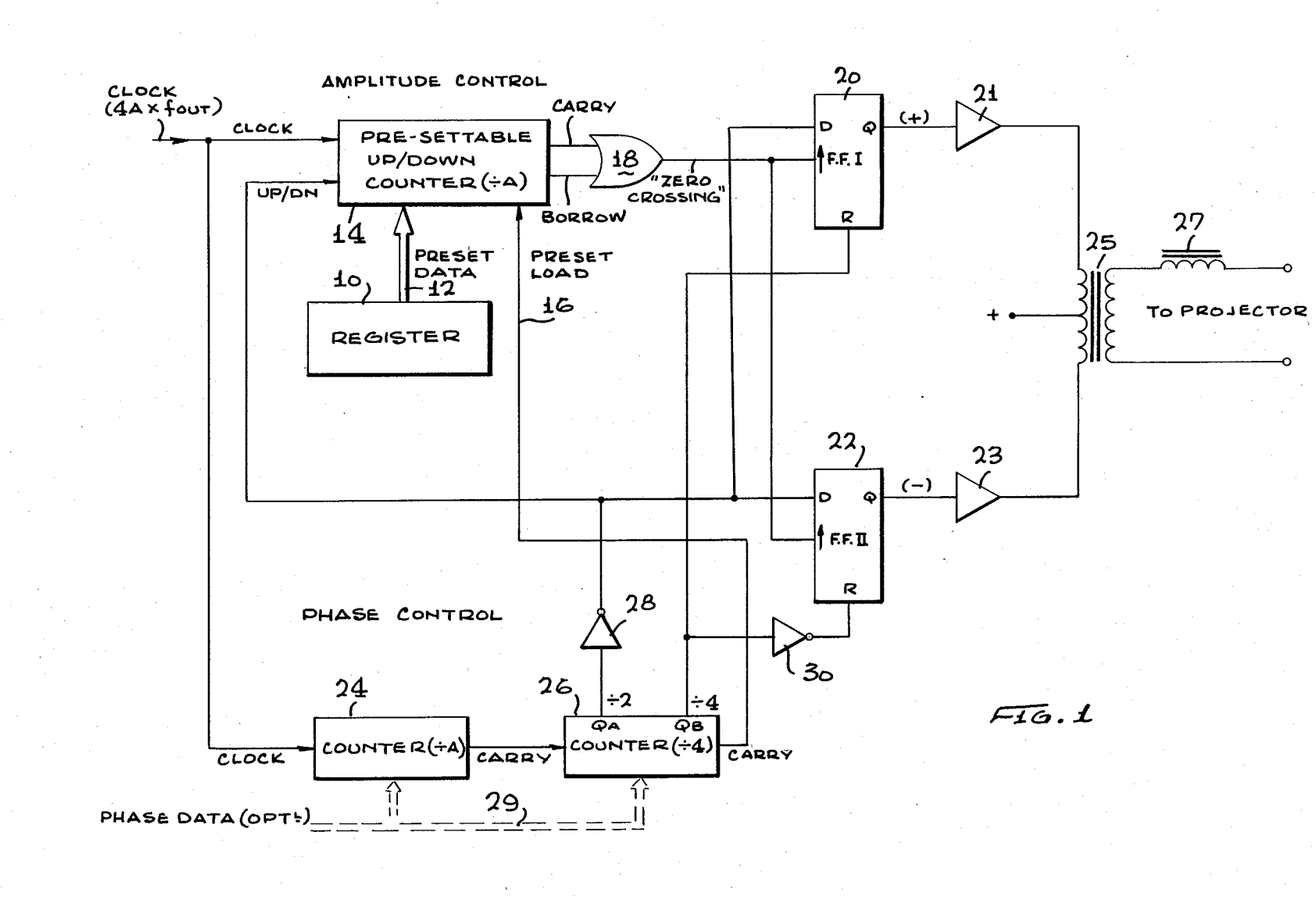
FIG. 1 is a schematic block diagram of a digital drive system according to my invention.

Referring now to FIG. 1, block 10 is a digital register containing a digital number defining the desired amplitude of the next output cycle of the amplifying device. This register may be a read only memory (ROM), the output of a telemetry system, a portion of a microprocessor or a microcontroller system, a counter which is incremented or decremented as a function of an error between some reference and some desired function, or the like. The digital representation will normally be in binary format, but may be in any other format. The current digital number is connected through a bus 12 to a presettable up/down counter 14. Counter 14, which also divides by a desired integer A, receives an input from a system clock, now shown at a frequency 4A times the desired output frequency of the amplifying system. The direction of count, i.e., count up or count down, is controlled from the phase control system, discussed below. Internal decoders of the counter provide carry and borrow signals when the count of the counter passes through a predetermined digital number, usually zero. The digital number held in register 10 is presented as preset data to counter 14 and is entered when a pulse is present on the present load line 16. An OR gate 18, combines the carry and borrow pulses to provide pulses representative of zero crossing for application to the clock inputs of multivibrators or flip-flops I and II, numerals 20 and 22, respectively.

A counter 24 receives the same clock input as up/down counter 14. Since the clock output is 4A times the desired output frequency, counter 24 divides the clock input by A and provides carry pulses at periods one-fourth the period of the output frequency, corresponding to the exact quadrature points of the desired output phase. An additional counter 26 divides the output from counter 24 by four to provide a carry pulse corresponding to the zero degree point of the output phase. This output carry from counter 26 is applied through line 16 as a preset load command to the presettable up/down counter 14. Thus, this load command signal provides, once for each desired output cycle, at the zero degree point, a preset signal which presets counter 14 with the digital number then in register 10.

Figure 2:
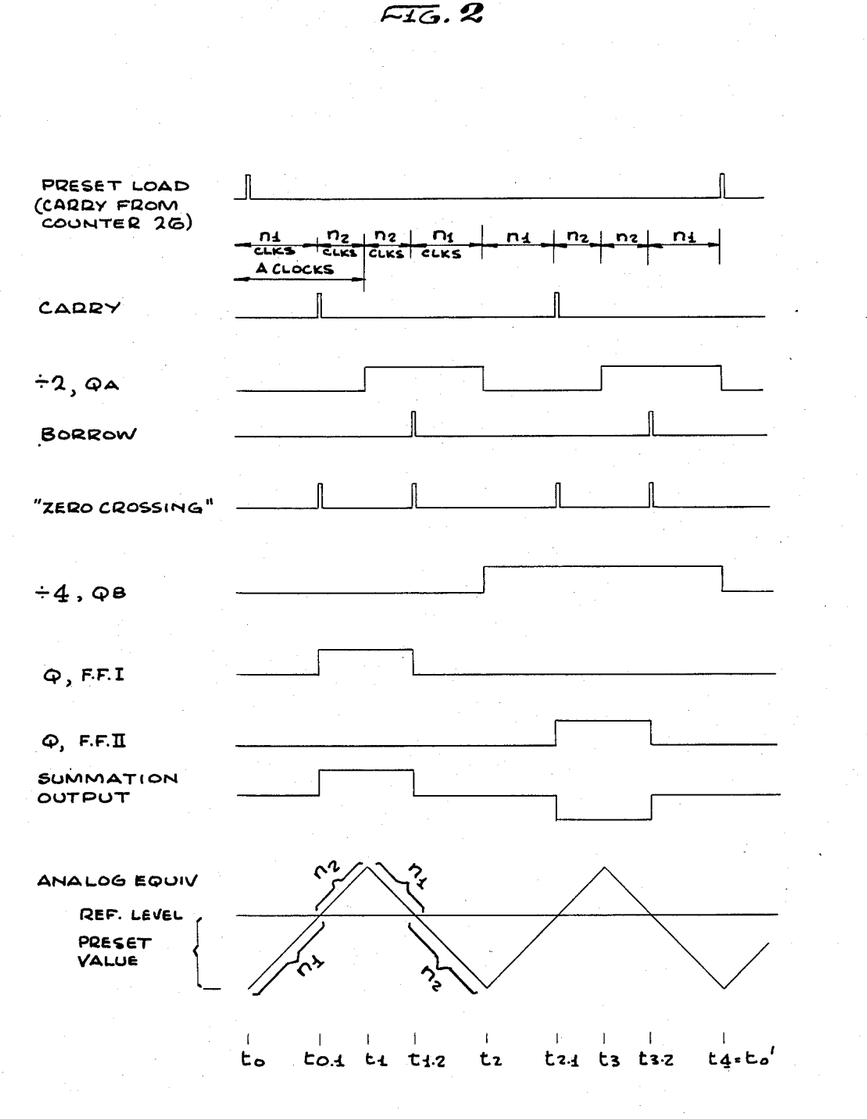
FIG. 2 constitutes a series of timing diagrams relating generally to the system of FIG. 1.

Examination of FIG. 2 will clarify the above described operation. Assuming all counters 14, 24 and 26 start at time $t_0$, it will be seen that the carry output from counter 26 will preset presettable up/down counter 14 with the number in register 10 at this time. Starting from the preset value, the up/down counter 14 will count clock pulses until the count reaches a desired decoded output value, normally zero, at which time a carry pulse is generated. On FIG. 2 this time is represented by $t_{0.1}$. This carry pulse is supplied through OR gate 18 to both of flip-flops 20 and 22. At time $t_0$ the divide by 2 output QA of counter 26 will be low. Inverter 28 will, however, generate a high level signal which provides a "high" input to the D input terminals of both of flip-flops 20 and 21. Output QB, the divide-by-four output of counter 26, will also be low at this time. Through inverter 30, this output is converted to a "high" at the reset input of flip-flop 22 which overrides any clock or data signals and inhibits flip-flop 22 from operation. Flip-flop 20 is not inhibited at this time. With a positive signal on its D input and the clock from the carry of the up/down counter 14 through OR gate 18 on its clock input, flip-flop 20 will change state and apply a "true" to the plus switch signal output. During the time from $t_0$ to $t_{0.1}$ $n_1$ clocks will have occurred. As no other signals will have changed, up/down counter 14 will continue to count "up" an additional number of counts $n_2$ such that $n_1$ plus $n_2$ equals A, the total number of counts. At the end of A clock periods, counter 24 will generate a "carry" causing output QA of divide-by-four counter 26 to change state. Through inverter 6, this is applied to presettable up/down counter 14 and changes its direction of count from up to down. This time is indicated at $t_1$ of FIG. 2. Since up/down counter 14 has a count of $n_2$ at the time of changing from up count to down count, it will obviously require $n_2$ clock pulses to return to the decoded borrow output number (typically zero). The borrow output through OR gate 18 again puts a clock pulse on flip-flops 20 and 22. Flip-flop 22 is still maintained in the reset condition by the QB output of divide-by-four counter 26. Flip-flop 20, however, now has a zero on its D input because of the changed state of QA of counter 26. Flip-flop 20 therefore changes state again, removing the plus switch signal at time $t_{1.2}$ (FIG. 1). Divide by A counter 24 continuous accumulating counts until it again has counted A clock pulses at time $t_2$ and provides another carry pulse to counter 26. This returns output QA of counter 26 to its "low" state as the QB output becomes "high". The high output on QB of the divide-by-four counter applies a reset to flip-flop 20, inhibiting its operation. Inverter 30 converts this "high" to a "low" at the reset of flip-flop 22 which will permit it to be triggered by subsequent clock signals.

The count existing in the presettable up/down counter 14 at this time will equal the original preset value since $n_2+n_1$ equals A counts. The return of QA to the low state returns the up/down counter 14 to the up count mode. $n_1$ counts later the presettable up/down counter 14 will again generate a carry output at time $t_{2.1}$ (zero crossing). This carry output, through OR gate 18, will trigger flip-flop 22, thus generating a "true" on the minus switch signal output.

The operation of the balance of the cycle $t_{2.1}$, $t_3$, $t_{3.2}$, $t_4$ is the same as that corresponding to $t_{0.1}$, $t_1$, $t_{1.2}$, to $t_2$, respectively. The effective output of the complete power amplifier system is shown in FIG. 2 as the summation output. Time $t_4$ is equal to the $t_0$ time for the next cycle, shown as $t_0'$. The preset load command generated at this time will enter the value then existing in register 10 which may be a different value from that existing during the previous cycle. It will be apparent that the time intervals of the plus switch signal and the minus switch signal are identical. Therefore, the requirement for equality of the volt-second product in the output transformer is met so far as the drive conditions are concerned, dependent only on the stability of the clock source.

In the above description, it was assumed that at start time $t_0$ the phase control counters, 24 and 26, started from zero. If, instead, the counters 24 and 26 are presettable counters and are preset with some number other than zero, the phase of the output signal will be delayed with respect to the time of starting, by a value entered into counters 24 and 26. In a sonar transmitter application, this feature is utilized to provide independent phase control among a multitude of individual element driving transmitters, so as to control the direction of the beam transmitted by the acoustic projectors.

If it is desired to change the phase during a given output sequence, it will be appreciated that it is necessary to control the time of entry of the new phase data word to a time when neither plus or minus switching signals are enabled. If this is a limitation, counters 24 and 26 can be replaced with two sets of counters and switching provided alternatively between them, such that new phase data is entered into the phase control counters that are not at that time controlling the output. Simple switching logic, controlled by the carry output of the counter then in use, will ensure synchronization. Similarly, register 10 must be changed only during times that do not corrrespond to the preset load command generated by the carry output of the divide-by-four counter 26.

It will be appreciated that in a practical implementation of the system described it will usually be necessary to provide additional control gating to assure against false clocking, "sliver pulses" of carry outputs, and the like. Utilization of such well known techniques results in units that can be applied without shielding to drive satisfactorily 10 independently controlled output amplifiers of 2 kW each, co-located and without shielding, for example. This cannot be done using the analog control system customarily employed.

Figure 3:
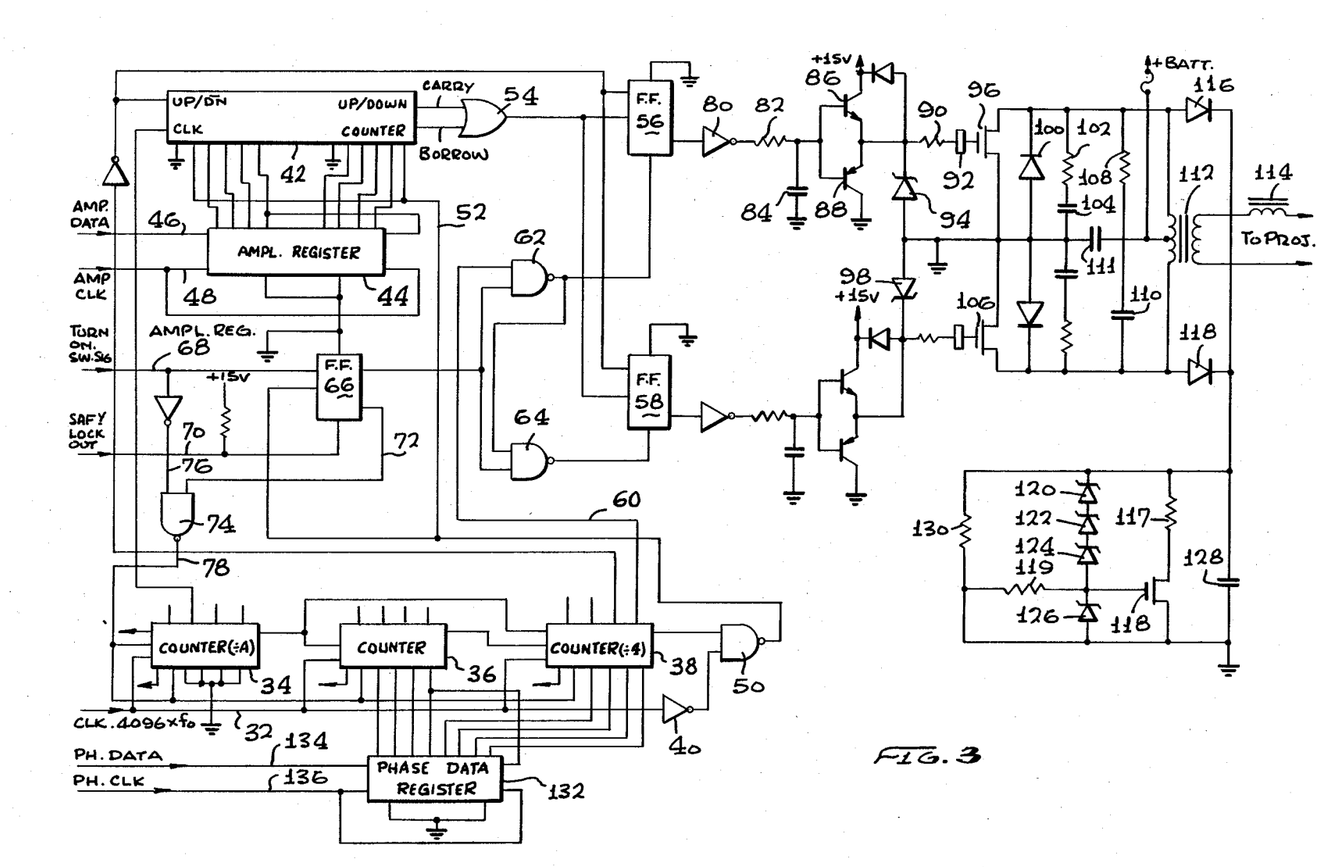
FIG. 3 is a schematic diagram of a practical digital drive system according to my invention.

FIG. 3 is a schematic diagram of a practical digital drive system designed for moderately high power output to a sonar projector. In this system a clock pulse at a frequency 16 times $f_o$ (output frequency) is supplied on a line 32 to a plurality of counters 34, 36 and 38 and to an inverter 40. This clock pulse is divided in counter 34 and a clock pulse at 4A times $f_o$ is supplied to a clock terminal of a presettable up/down counter 42. This counter, which is directly analogous to counter 14 of FIG. 1, also has an up/down input which receives signals from the phase control system, discussed below. Also connected to presettable up/down counter 42 is an amplitude register 44 which includes an amplitude data line 46 and a clock line 48 which clocks the desired amplitude data into register 44. The digital data in register 44 is provided as preset data to counter 42, which data is entered when a pulse is received at counter 42 from counter 38 through a NAND gate 50 and a line 52. An OR gate 54 receives carry and borrow pulses from counter 42 to provide pulses representative of zero crossing for application to the clock input terminals of flip-flops 56 and 58.

As described with respect to FIG. 1, counter 34 divides the clock input by A and provides carry pulses at periods one-fourth the period of the output frequency, corresponding to the exact quadrature points of the desired output phase. Counter 38 divides the output of counter 34 by four to provide a carry pulse corresponding to the zero degree point of the output phase to counter 42 through NAND gate 50 and line 52. Inverter 40 and NAND gate 50 cooperate to block silver pulses which may occur as a result of important operation of counters 34, 36 or 38 from providing spurious inputs to counter 42.

The operation of flip-flops 56 and 58 are essentially as described above with respect to flip-flops 20 and 22. In this instance the "divide-by-four" output from counter 38 appearing on a line 60 is connected through a first NAND gate 62 before being connected to the reset terminal of flip-flop 56 and also from the output of NAND gate 62 to the input of an additional NAND gate 64 which is connected to the reset terminal of flip-flop 58. The function is as described with respect to FIG. 1 except that NAND gates 62 and 64 provide a means to incorporate an additional input from a flip-flop 66 which receives a "turn on" signal on line 68. Flip-flop 66 also receives at its clock input the carry pulse from counter 38 and NAND gate 50 which will cause its Q output to go high. At its reset terminal it receives on a line 70 an input from a safety lock-out circuit which may, for example, respond to the removal of a cover, to cause the 15 V source connected in this line to place a "high" on reset terminal R which causes the system to be turned off. Connected to the $\overline{Q}$ terminal of flip-flop 66 is a line 72 which is connected to one input terminal of a NAND gate 74. The other input terminal of gate 74 is connected to line 68 through an inverter 76. The output of gate 74 is connected through a line 78 to counters 34, 36 and 38. It is the function of this circuit to stop these counters if the system is turned off through line 68 or if the lockout trips. It is undesirable to stop the system in mid-cycle because of the disadvantages of leaving residual magnetism in the core of the output transformer so the system runs until a carry pulse is supplied from NAND circuits 50 to the clock input of flip-flop 66. This causes an output from the $\overline{Q}$ output through line 72 to NAND gate 74 which stops counters 34, 36 and 38.

In normal operation the turn on switch signal at the D terminal of flip-flop 66 is high such that upon receipt of a carry pulse from NAND circuit 50 at its clock input, it provides a "true" or "high" input from its Q terminal to each of the lower input terminals of NAND gates 62 and 64. The "divide-by-four" output from counter 38 carried on line 60 supplies a "low" signal to NAND gate 62 which results in a "high" input signal at the reset terminal of flip-flop 56 and a resulting "high" output at its $\overline{Q}$ gate. In the next half cycle, a high output from the "divide-by-four" output of counter 38 results in a "low" at the output of NAND gate 62 and at the reset terminal of flip-flop 56, which stops the output from this flip-flop. At the same time the "low" at the output of NAND 62 results in a "low" at an input to NAND gate 64 causing it to emit a "high" to the reset terminal of flip-flop 58 and an output at its $\overline{Q}$ terminal.

The times of output for each of flip-flops 56 and 58 are identical as described above and alternate as shown in FIG. 2. The output of flip-flop 56 is supplied through an inverter 80 and a circuit consisting of a resistor 82 and a capacitor 84 which serves to slow down or round off the pulses before they are connected to a two-way emitter-follower circuit consisting of transistors 86 and 88 connected between a voltage source and ground which is essentially an impedance matching means, before being connected through an input resistor 90 and a ferrite bead 92 to a high power field effect transistor (FET) 96. Ferrite bead 92 is effective to suppress very high frequency oscillations. A zener diode 94 is connected between input resistor 90 and ground and a similar zener diode 98 is connected in the input circuit of the FET 106 to limit the magnitude of the input signal to the FETs 96 and 106 if faults or inductive ringing causes the voltage to exceed a safe level. Connected across output circuit of FET 96 are a diode 100 which grounds any reverse currents and a circuit consisting of a resistor 102 and a capacitor 104 which cooperate to suppress very sharp spikes. The circuit thus far described is exactly duplicated in the output of flip-flop 58 which ultimately drives FET 106. A further spike suppression circuit consisting of a resistor 108 and a capacitor 110 is connected between the output terminals of FETs 96 and 106, which drive opposite ends of the primary side of an output transformer 112. A center tap on this primary winding is connected to a source of d.c. voltage, such as a battery which is the main source of the system output power. The secondary winding of transformer 112 is connected through a choke 114 to a load device which may be a sonar projector.

Because of the fast rise and fall times of the pulses generated in the above described circuit, the various stray inductances and capacitances can generate some extremely fast rising voltage spikes which have the capability of destroying some components, particularly the output FETs 96 and 106. To provide extra protection, applicant has connected diodes 116 and 118 between the ends of the primary winding of transformer 112 and a spike suppression circuit including a capacitor 128, and the discharge circuit consisting of resistor 117, FET 118, zener diodes 120, 122, 124, and resistor 130, capacitor 128 provides a low impedance path to ground for spikes conducted from the output (drain) circuits of FETs 96 and 106 through respective diodes 116 or 118. If the spike energy carries the voltage across capacitor 128 higher than the sum of the breakdown voltages of zener diodes 120, 122 and 124 in series, FET 118 turns ON, connecting very low resistance resistor 117 across capacitor 128. This immediately dissipates the excess spike energy. Resistor 130 discharges capacitor 128 and, through diodes 116 and 118 also discharges capacitor 111 when the circuit is de-energized to avoid hazard to maintainance personnel. Resistor 119 serves to turn FET 118 OFF when it is no longer needed, i.e., after spike energy has been dissipated. Zener diode 126 prevents the gate voltage of FET 118 from using to unsafe voltages.

The system described above operates in the same manner as described above with respect to FIG. 1 with the exceptions and additions described above to deal with the practical problems of providing a safety interlock, a turn-on circuit, and silver pulse and spike suppression means. Also included in a phase data register 132 which is a counter having a number of connections to counters 36 and 38 for the purpose of introducing phase data when it is desired to vary the phase of the output relative to the main clock and the quadrature points defined by counter 34. Data defining the desired phase is supplied on a line 134 and is clocked into register 132 by clock pulses from a phase clock (not shown) appearing on a line 136. Phase data register 132 may then supply input counts to counters 36 and 38 to control the phase of the output appearing at transformer 112. In a conventional sonar system there may typically be anywhere from eight to sixteen such systems, each operating a projector whose output can phase vary by, for example, forty-five degrees or twenty-two and one-half degrees from an adjacent projector, thus steering the acoustic output more in the water as desired.

Figure 4:
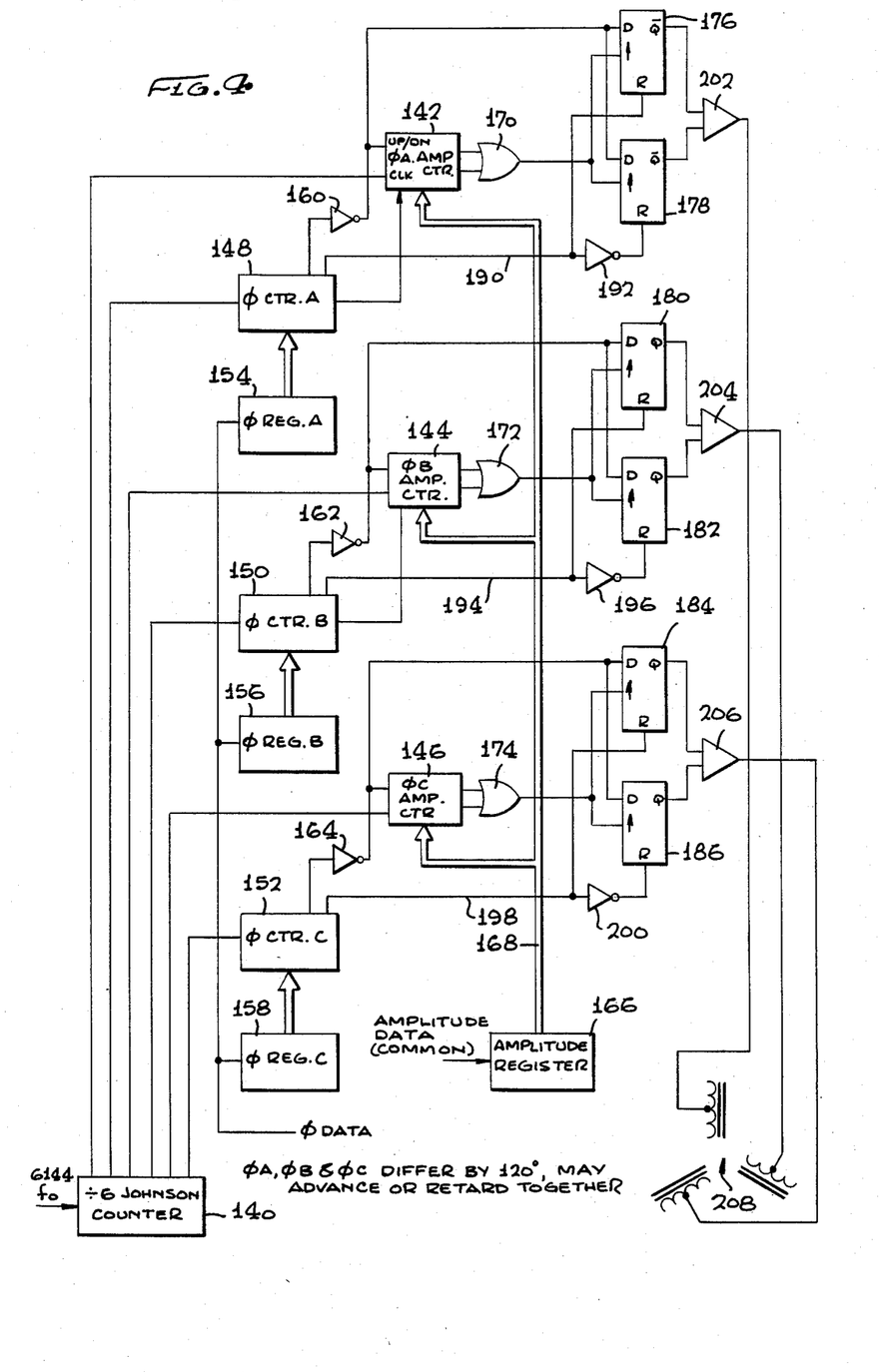
FIG. 4 is a shematic block diagram of another embodiment of my invention.

FIG. 4 is a simplified schematic block diagram of an embodiment of my invention driving a three-phase utilizing device such as a three-phase electric motor. In this system it will be presumed that the reader will be able to implement the system as shown in FIG. 3 or with so much of the control and spike suppression means as are required for a particular application. In this embodiment, each phase essentially becomes a separate digital drive system. A counter 140 receives a clock input at a frequency which is preferably conveniently divisible by six such as 6144×the desired output frequency. This counter divides by six and supplies clock pulses to the clock input terminals of the amplitude control counters 142, 144 and 146 which are presettable up/down counters for phases A, B and C, respectively. Counter outputs from counter 140 are also supplied to individual phase counters 148, 150 and 152 for phases A, B and C, respectively. These counters correspond generally to counter 24 and 26 of the FIG. 1 embodiment. A plurality of phase registers 154, 156 and 158 are connected to phase counters 148, 150 and 152, respectively. Phase data (120° apart) is clocked into the phase registers 154, 156 and 158 and these phase changes advance or retard together. The phase counters 148, 150 and 152 are connected through one of inverters 160, 162 or 164 to the up/down counter input of amplitude control counters 142, 144 or 146 and each phase counter also supplies a carry pulse to a preset load terminal of its respective amplitude control.

An amplitude register 166 which may correspond to the amplitude register 10 of FIG. 1, provides identical preset amplitude data which is clocked into the amplitude controls 142, 144 and 146 by means of a bus 168. This amplitude information is counted in the amplitude controls as described above and carry or borrow inputs supplied to the OR gates 170, 172 and 174 from whence they are supplied as clock inputs to the respective flip-flops; OR gate 170 being connected to flip-flops 176 and 178; OR gate 172 being connected to flip-flops 180 and 182 and OR gate 174 being connected to flip-flops 184 and 186. Connected to the D terminals of the various flip-flops are the counts from the phase counters 148, 150 and 152, as inverted in inverters 160, 162 and 164. Phase counter 148 supplies a reset signal along a line 190 to flip-flop 176, and through an inverter 192, to the reset terminal of flip-flop 178. This reset switches the output from one flip-flop to the other as described above. Similarly, phase counter 150 supplies a reset signal on line 194 to flip-flop 180 and, through an inverter 196, to flip-flop 182; and phase counter 152 supplies a reset signal on line 198 to flip-flop 184 and, through an inverter 200 to flip-flop 186.

With the system described, the outputs of each pair of flip-flops must be essentially identical such that the two half waves of the input signals to the respective output amplifiers 202, 204 and 206 are identical. Except for the phase differences, each amplifier output is identical as supplied to the respective phase windings of the motor 208. Thus the signals supplied to the phase windings are balanced as to each phase and the signals supplied to the phases are essentially identical. By means of modifying the phase data at the inputs to the phase registers 154, 156 and 158, the motor 208 may readily be slowed somewhat or speeded up and the balanced condition remains, minimizing the danger of damaging output transistors or transformers or other components.

Those skilled in the art will recognize that the teachings herein may be utilized in a number of different embodiments and that many modifications are possible. While the above description covers single phase and three phase embodiments, it will be obvious that the teachings are directly applicable to two-phase or "N" phase embodiments, as well. As noted above, the invention described herein is particularly useful where there is a danger of damaging output FETs junction transistors or other components because of possible saturation of the output transformer core material, or where it is desired to program changes in amplitude without danger of unbalancing the two half periods of the waveform, or where it is desired to reliably control a plurality of such remotely located amplifying devices with respect to amplitude, relative phase, or both.

I claim:

1. A digital drive system for pulse width modulated power control including an output transformer, power amplifier means for driving said output transformer, load means connected to receive an a.c. output signal from said transformer characterized in that the drive system for said power amplifier means comprises first and second flip-flop circuits connected to said power amplifier means, gate means connected to said flip-flop circuits, a presettable up/down counter connected to said gate means, said counter including "CARRY" and "BORROW" output lines from said counter to said gate means, digital means containing a digital number defining the desired amplitude of the next cycle of said power amplifier means connected to provide an input signal to said presettable up/down counter, a clock connected to said presettable up/down counter providing output pulses at a frequency greater than the desired output frequency of said system by a desired multiple, counter means connected to said clock including a first divider having an output wherein said clock output is divided by a first factor of said multiple and a second divider having a first output wherein said first divider output is divided by two and having a second output wherein said first divider output is divided by four, means connecting said first output of second divider to an up/down terminal of said presettable up/down counter and to the "D" terminals of said flip-flops, means connecting the second output of said second divider to the reset terminal of said flip-flop, means connecting the inverse of the second output of said second divider to the reset terminal of said second flip-flop, a third output of said second divider operative when both of said first and second outputs of said second divider are true serving as a preset load command to the presettable up/down counter connecting the digital number in said digital register to said presettable up/down counter whereby upon receipt of said command said presettable up/down counter will count clock pulses until the count of said presettable up/down counter overflows, causing said presettable up/down counter to generate a carry pulse to said gate means thereby causing said first flip-flop output to change state, means responsive to a change of state of said first output of said second divider to cause said presettable up/down counter to count down the counts representing said digital number at which time it generates a borrow count causing first flip-flop to return to its original state, following which said presettable up/down counter continues to count down until said second divider first output again changes state and said second output of said divider also changes state resulting in inhibiting said first flip-flop and enabling said second flip-flop to cause a repetition of the above cycle for said second flip-flop, said system continuing to repeat said cycles for a desired period of time.

2. A digital drive system as claimed in claim 1 wherein said power amplifier means includes a pair of field effect transistors, one connected to the output of each of said flip-flops and each of said field effect transistors is connected to one half of the primary winding of said output transformer, a center tap of said primary winding being connected to a source of direct current voltage.

3. A digital drive system as claimed in claim 2 wherein a high frequency spike suppression circuit is connected between the drain and source terminals of each of said field effect transistors, said spike suppression circuit including a resistor and a capacitor in series.

4. A digital drive system as claimed in claim 2 wherein a circuit for suppressing high voltage spikes is connected between the ends of said primary winding and ground, said circuit including a capacitor, a third field effec transistor with a resistor connected in series across said capacitor, a plurality of series connected zener diodes having a breakdown voltage higher than twice the voltage of said direct current voltage source but lower than that which would damage said first and second field effect transistors connected across the gate to drain junction of said third field effect transistor, a fourth zener diode connected across the gate to source junction of said third field effect transistor, and resistance means having a high value connected across said plurality of zener diodes as a means of discharging said capacitor when power is removed from said system.

5. A digital drive system as claimed in claim 2 wherein a zener diode is connected in the input circuit of each of said field effect transistors to protect said transistors against voltage spikes or surges exceeding the desired input voltage.

6. A digital drive system as claimed in claim 1 wherein said digital means containing a digital number is connected to an amplitude data source and means are provided for clocking said amplitude data into said digital means.

7. A digital drive system as claimed in claim 1 wherein a digital phase data register is connected to said second divider, phase data means are connected to said phase data register and a phase clock is provided for clocking phase data into said phase data register for varying the output phase of said system relative to said first named clock.

8. A digital drive system as claimed in claim 1 wherein the amplitude information is stored in a counter which is incremented or decremented in response to an error signal representing the departure of the output voltage from a desired value.

9. A digital drive system as claimed in claim 1 wherein a third flip-flop is connected to a first line carrying a safety lock out signal and a second line carrying a turn on signal, said flip-flop being connected to a gate circuit, an inverter connected to said second line and to said gate circuit, said gate circuit having its output connected to said first and second dividers to cause said dividers to stop, and means connecting said preset load command to said third flip-flop such that said gate circuit is not caused to stop said dividers until a load command pulse is received indicating the completion of a full output cycle.

10. A digital drive system as claimed in claim 1 wherein a gate circuit is connected to receive said preset load command signal, and an inverse of said clock is connected to said gate circuit whereby any silver pulses in said third output emanating from said second divider are blocked.

11. A digital drive system for pulse width modulated power control including a plurality of load means, an output transformer connected to each of said load means, and power amplifier means for driving each of said output transformers, characterized in that the drive system for each of said power amplifier means comprises first and second flip-flop circuits connected to said power amplifier means, gate means connected to said flip-flop circuits, a presettable up/down counter connected to said gate means, said connector including "CARRY" and "BORROW" output lines from said counter to said gate means, digital means containing a digital number defining the desired amplitude of the next cycle of said power amplifier means connected to provide an input signal to said presettable up/down counter, a clock connected to said presettable up/down counter providing output pulses at a frequency greater than the desired output frequency of said system by a desired multiple, counter means connected to said clock including a first divider having an output wherein said clock output is divided by a first factor of said multiple and a second divider having a first output wherein said first divider output is divided by two and having a second output wherein said first divider output is divided by four, means connecting said first output of second divider to an up/down terminal of said presettable up/down counter and to the "D" terminals of said flip-flops, means connecting the second output of said second divider to the reset terminal of said first flip-flop, means connecting the inverse of the second output of said second divider to the reset terminal of said second flip-flop, a third output of said second divider operative when both of said first and second outputs of said second divider are true serving as a preset load command to the presettable up/down counter connecting the digital number in said digital register to said presettable up/down counter whereby upon receipt of said command said presettable up/down counter will count clock pulses until the count of said presettable up/down counter overflows, causing said presettable up/down counter to generate a carry pulse to said gate means thereby causing said first flip-flop output to change state, means responsive to a change of state of said first output of said second divider to cause said presettable up/down counter to count down the counts representing said digital number at which time it generates a borrow count causing first flip-flop to return to its original state, following which said presettable up/down counter continues to count down until said second divider first output again changes state and said second output of said divider also changes state resulting in inhibiting said first flip-flop and enabling said second flip-flop to cause a repetition of the above cycle for said second flip-flop, said system continuing to repeat said cycles for a desired period of time.

12. A digital drive system as claimed in claim 11 wherein a digital phase data register is connected to said second divider in each of said drive systems, phase data representing different output phase angles is connected to each of said digital phase registers and phase clock means are provided for clocking the desired phase data into said digital phase registers.

13. A digital drive system as claimed in claim 11 wherein said load means is a three-phase load device having three load windings, said power amplifier means including first, second and third amplifiers driving each of said load windings, said first and second flip-flop circuits are connected to said first amplfier, third and fourth flip-flop circuits are provided connected to said second amplifier, fifth and sixth flip-flop circuits are provided connected to said third amplifier, said gate means includes a first gate circuit connected to said first and second flip-flops, a second gate circuit connected to said third and fourth flip-flops, and a third gate circuit connected to said fifth and sixth flip-flops, said presettable up/down counter is connected to said first gate circuit and a second presettable up/down counter is provided connected to said second gate circuit and a third presettable up/down counter is provided connected to said third gate circuit, said digital means containing a digital number is connected to provide identical amplitude information to said first, second, and third presettable up/down counters, said second divider has its first output connected to the up/down terminal of said first presettable up/down counter and to the "D" terminals of said first and second flip-flops, a third divider is provided essentially identical to said second divider having its first output connected to the up/down terminal of said second presettable up/down counter and to the "D" terminals of said third and fourth flip-flops, a fourth divider is provided essentially identical to said second divider having its first output connected to the up/down terminal of said third presettable up/down counter and to the "D" terminals of said fifth and sixth flip-flops, means are provided connecting the second output of said third divider and of said fourth divider to the reset terminals of said third and fifth flip-flops, respectively, means are provided connecting the inverse of the second output of said third and fourth dividers to the reset terminals of said fourth and sixth flip-flops, respectively; a third output of each of said third and fourth dividers operative when both of the first and second outputs of said third and fourth dividers are true serving as a preset load command to the second and third presettable up/down counters, respectively, to connect the digital number in said digital register to said second and third presettable up/down counters to cause said counters to count clock pulses in the same manner as said first named presettable up/down counter, first, second and third digital phase data registers connected to said second, third and fourth dividers, phase data means connected to said phase data registers which data calls for said phases to differ by 120 degrees, and phase clock means for clocking said data into said phase data registers.

* * * * *